Figure 1:
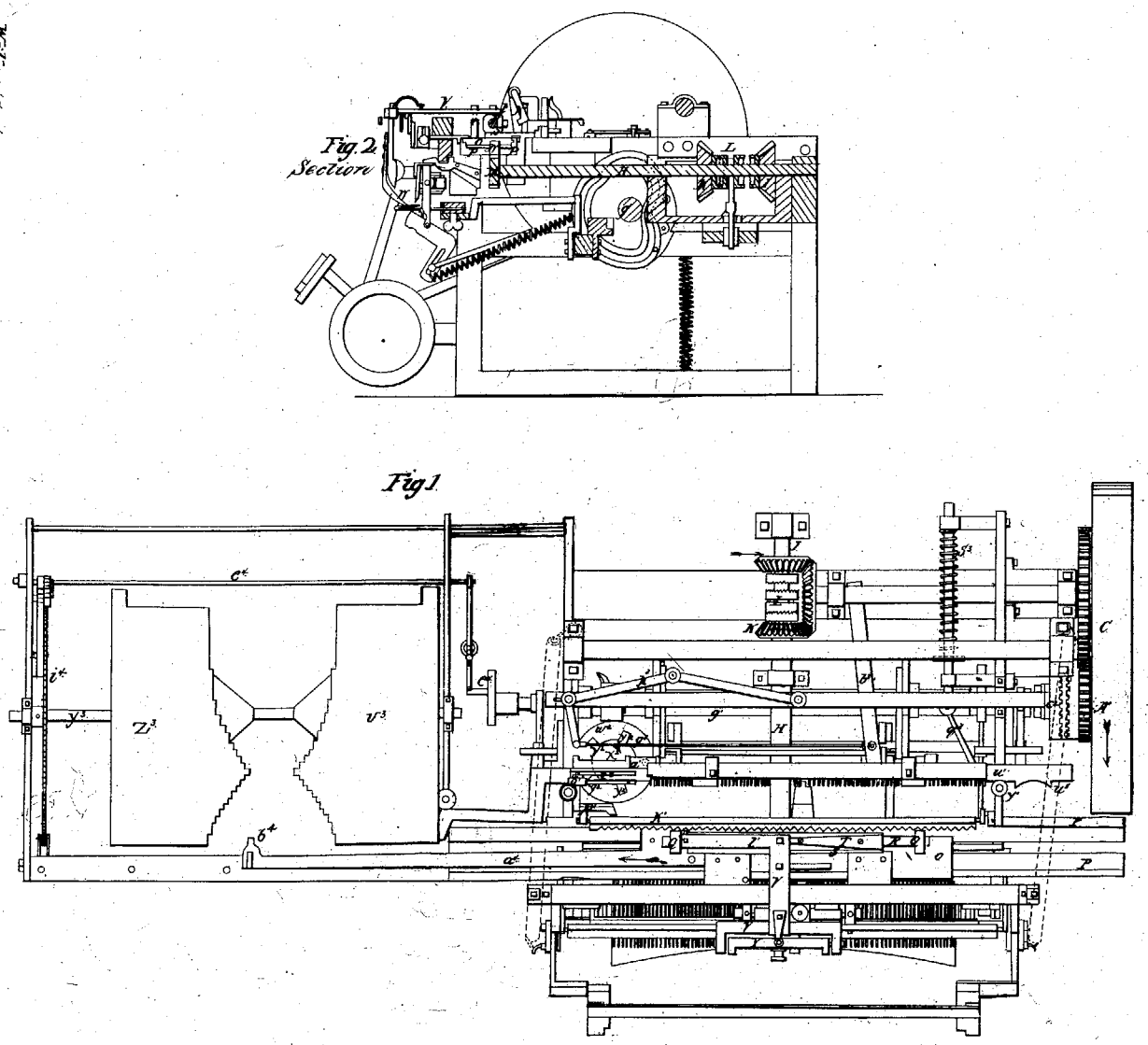

H. Burt.

Knitting Straight.

No. 916. Reissued Feb. 28, 1860.

Fig. 2 Section

Witnesses:
S. H. Maynard,
C. Clarkson Jr.

Inventor:
The Newark Patent Hosiery Company
by their Attorney
S. P. Ferguson

UNITED STATES PATENT OFFICE.

THE NEWARK PATENT HOSIERY COMPANY, OF NEWARK, NEW JERSEY, ASSIGNEES, BY MESNE ASSIGNMENTS, OF HENRY BURT.

IMPROVEMENT IN MACHINES FOR KNITTING STOCKINGS, &c.

Specification forming part of Letters Patent No. 3,275, dated September 23, 1843; extended 7 years; Reissue No. 916, dated February 28, 1860.

*To all whom it may concern:*

Be it known that HENRY BURT, of Boston, in the county of Suffolk and State of Massachusetts, did invent certain new and useful Improvements in Machines for Knitting Stockings, &c., the entire rights to which he has assigned to the corporation known as "THE NEWARK PATENT HOSIERY COMPANY" of Newark, in the county of Essex and State of New Jersey; and I, DAVID A. HAYES, president of said corporation, do hereby declare that the following is a full, clear, and exact description thereof, reference being made to the accompanying drawings, forming a part of this specification—that is to say:

Previous to the date of said invention no method had been devised whereby the variations of the width of a knitted fabric necessary to the shape of the desired article—as a stocking, shirt, &c.—could be produced automatically. In all power knitting-frames the fabric had been made of an uniform width, and the article was cut out of it to the shape desired. This, besides causing a great waste of material, also produced an inferior fabric, from the fact that there was not a perfect selvage at the cut edges. In other knitting frames or machines, if the material were widened or narrowed, it was done by the hand of an operator. By the improvement of said BURT any desired variations in the width of the fabric as the work progresses may be effected automatically.

The nature of said invention consists, then, in combining with a knitting-machine which forms a looped or knit fabric generally in the usual manner a mechanism which effects automatically the desired variations in the width of the fabric, or in the form of the fabric at the edge, according to any pattern or shape, by means of a design or pattern previously prepared in accordance therewith.

In Figure I is a top view of a knitting-frame having combined with it a pattern-cylinder for effecting the variation in the number of stitches to be made as the work progresses, in order to widen and narrow the fabric in accordance with the governing design of said pattern-cylinder, and for a detailed description of the said machine I refer to Letters Patent issued to said company and bearing even date herewith.

The pattern-cylinder is represented at $v^3$ and $z^3$, and is shown as attached to the knitting-frame from the left-hand end. This cylinder effects the widening or narrowing by stopping the yarn-guide over any particular needle and retaining it there, and it also is employed to cause the reversing of the motion and the traveling of the yarn-guide in the reverse direction, keeping up this action so long as knitting is being done.

The governing device upon the pattern-cylinder consists of a series of stops or notches cut upon the edge of the drums $z^3$ and $v^3$, facing each other, and as clearly seen in the drawings. These notched edges approach and recede from each other, leaving the space between them at varying distances apart. A stud, $b^4$, upon a rod, $a^4$, extending from the yarn-guide carriage, as the latter plays back and forth, strikes upon one or the other of these notched edges, according to the direction in which it is moving, and its further movement is thereby arrested. The pattern, cylinder, being made to revolve upon its axis with a properly-regulated motion, brings in succession every notch and portion of the pattern-edges past the stud $b^4$, and accordingly acts upon it. The space between these edges therefore exhibits proportionately the shape the fabric will have.

At P P are seen guides which support the yarn-guide carriage, a space being left between for the toothed rack N, Fig. II, attached beneath to the said carriage, to pass down to the driving-pinion M. The slide of the carriage is seen at *o*, and has upon it fixtures to which the yarn-guide W is attached. This fixture consists, in the first place, of a forked arm, V V, one end of which is attached to the slide-plate *o* in the following manner:

At Q Q is represented two studs, between which is supported a rod, R, upon which plays a tube, S, of less length than the rod, and to this is affixed the arm V. It will be perceived that space is thus left for the tube to slide upon the rod between the studs Q. This is necessary because the yarn-guide tube must have its motion arrested the moment that the stud $b^4$ strikes the pattern-cylinder, in order that it may stop at the exact needle, while the carriage itself continues to move on until it has effected the reversing of the shifting-bar.

At T is a friction-spring fastened to S, having a detaining-stud passing down from its end through a hole in the tube, so that it can press upon R, and thus overcome the momentum and cause the tube to be carried along on the spot it was left at upon R, when the detaining-clutch is disengaged.

Suspended in the fork of V is supported the cross-head of a T-shaped piece, Y, to the upper end of which the yarn-guide tube W is attached. This piece can swing in the fork so that the tube may be removed out of the way of the needles when the presser-bar shall come down to close the barbs.

Immediately behind the tube S, and lying parallel with it, is a rack of pointed teeth, $k'$, supported in standards in such manner that it may swing to and from the tube S, and upon the tube is a tooth, $l'$, projecting toward $k'$. The moment the stud $b^4$ strikes the pattern on the cylinder the long rack is forced forward and made to interlock with the tooth $l'$, and thus the motion of the yarn-guide is instantly arrested opposite to any given needle indicated by the pattern. To accomplish this the pattern-cylinder is made to be capable of sliding along the shaft $y^3$, upon which it revolves, so that by this sliding movement it may operate upon the shifting or reversing bar $w'$, in the manner described in the Letters Patent already herein referred to. When the movement of the carriage $o$ has brought the stud $b^4$ to strike against the pattern-barrel, it drives the latter along its shaft $y^3$.

The shifting-bar $w'$ is connected to the end of the pattern-barrel, and is thus also moved, and this again effects a motion of the rack $k'$, as follows: At $p'$ is a lever, one end of which presses upon the back of the rack $k'$. The other terminates in a roller, S'. This roller rides upon a bar, $t'$, attached to the shifting-bar $w'$. The bar $t'$ has two depressions, so that as the shifting-bar moves, the roller is raised and causes the end $p'$ to press upon the rack, thereby engaging its teeth with that on the tube S, and holding it thus engaged until the sinkers have been depressed, the needles withdrawn and pushed out again for the complete formation of the stitches of the last course, when the shifting-bar effects the reversal, and the roller S', dropping into the opposite cavity on $t'$, disengages the rack again. After each stitch the pattern-barrel is revolved a certain distance to bring another portion of the stops upon it to bear. This is effected by a circular ratchet-wheel, $i^4$, upon the end of the shaft $y^3$, the turning of which partially revolves the barrel by a feather engaging in a groove upon the hubs of the latter in a common manner. The clicks or pawls work from a vibrating rod, $e^4$, connected to a crank, $c^4$, upon the end of the shaft $g'$. The knitting is effected by the action of two shafts, H and $g'$, which lie at a right angle to each other, as seen in the drawings. These shafts are never simultaneously in action, for as the clutch of one engages with the main driving-power the clutch of the other is to be disengaged. The shaft H is that which propels the yarn-guide to and fro over the row of needles, while $g'$ is the cam-shaft and operates upon the sinkers and needles, together with certain other parts, in a manner common to knitting-frames. At L is a clutch which engages and disengages between two bevel-wheels, I and K, which revolve in opposite directions, and of course turn the shaft in accordance with whichever wheel it may be in gear with. The cam-shaft revolves only in one direction. Its clutch $c^2$ engages in the pinion A', always in motion one way.

The operation will be as follows: The driving-wheel C being in motion in the direction of the arrow, the two bevel-wheels I and K will be driven in the direction indicated. As the clutch L is engaged with K, the shaft H will, through its pinion M, Fig. II, acting upon the rack N, propel the yarn-guide carriage $o$ in the direction of the arrow, Fig. I. Thus the stud $b^4$ will be carried toward the pattern-barrel $Z^3$, and, striking that, will push both portions of the same along the supporting-shaft $y^3$. The shifting-bar $w'$ being moved thereby, the roller S' will mount the elevation on $t'$ and at once throw the rack $k'$ forward to engage the yarn-guide tube S and arrest its further motion. The yarn-guide will then have laid a course of yarn upon the shanks of only the number of needles permitted by the pattern-barrel, (it being understood that yarn was being supplied in the usual way.) Meantime, the carriage continuing its motion, the rod R will slide through the tube S until the shifting-bar has performed its office of disengaging the clutch L and of engaging that of $c^2$. The shifting-bar, moving the right angled-lever $b^3$, connected with the clutch L, disengages it from K, at the same time moving a toggle-lever, $k^3$, through the connecting-rod $g^3$, the straightening of which toggle thrusts the clutch $c^2$ into gear with A'. The clutch L then stands halfway between the two bevel-wheels I and K, and of course all further motion in the yarn-guide carriage and shifting-bar is arrested until the cam-shaft $g'$, thus set in motion, acts upon the needles and sinkers and until all is effected that belongs to that part of knitting, as usual, to complete the course and as described in the patent hereinbefore referred to. At this time the projection $u^3$ of the shifting-bar is upon the roller $y'$, and the lever $q^3$, Fig. I, has its angle of direction opposite to that shown in the drawings, and tending by the face of the spring $S^3$ to thrust it toward the left-hand end of the knitting-frame. The pin $a'$ (shown in dotted line) is at the opposite side of the depression $x^2$, seeking to enter one of the cavities $y^2$. As the wheel $w^2$ is moved by the cam-shaft, one of the depressions is caused to come into position when said shaft has performed its office for the completion of the stitch. The pin $a'$, which is now pressing hard against the circle bounding $x^2$ by the thrust of $q^3$, enters $y^2$ when that comes along into the proper position by the further sudden movement of the shifting-bar $u'$. This movement causes the toggle $k^3$ to be cranked in the opposite direction to that shown, and this, withdrawing the clutch $c'$, arrests the further motion of the cam-shaft $g'$. At the same time $b^3$ carries the clutch L into the bevel-wheel I the roller S′ drops into the opposite recess, and thus draws back the rack $k'$. The yarn-guide carriage is then moved in the opposite direction, laying yarn for the next course. The shifting of the clutches then takes place again, when the stud $b^4$ strikes the pattern $v^3$, and the movements go on, as before described. The pattern-cylinder advancing after each course to a certain distance, every part of the pattern is brought to act upon the yarn-guide, and thus it regulates the widths of the fabric as the knitting goes on.

Having thus described the character of the invention of the said HENRY BURT, which is claimed therein as new, and which the aforesaid company desires to secure by Letters Patent, is—

The combination, with a knitting-machine which is capable of producing a fabric of uniform width, of a pattern-cylinder or equivalent governing device having upon it a prearranged pattern, in such manner that said device shall control automatically the formation of more or less stitches or loops as the work progresses, whereby variations in the width of the fabric may be effected in accordance with said prearranged pattern, as set forth herein.

In testimony whereof I, the said DAVID A. HAYES, have hereunto subscribed my name as such president, and have caused the seal of said corporation to be hereunto affixed this 26th day of December, A. D. 1859.

DAVID A. HAYES, [L. S.]
*President, &c.*

Witnesses:
J. P. PIRSSON,
S. H. MAYNARD.